United States Patent
Yeh et al.

(10) Patent No.: US 7,813,301 B2
(45) Date of Patent: Oct. 12, 2010

(54) SHRINK WRAP TECHNIQUE FOR ENCLOSING MULTIPLE POLYGONS

(75) Inventors: Ching-Yun Yeh, Tampa, FL (US);
Robert Funk, Lewisville, TX (US);
Kumar Annamraju, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 12/117,048

(22) Filed: May 8, 2008

(65) Prior Publication Data

US 2009/0279453 A1 Nov. 12, 2009

(51) Int. Cl.
*G06K 9/46* (2006.01)
(52) U.S. Cl. .................. 370/254; 345/421; 345/607; 382/195; 703/4
(58) Field of Classification Search .................. None
See application file for complete search history.

(56) References Cited

U.S. PATENT DOCUMENTS

2006/0256112 A1* 11/2006 Heirich et al. .............. 345/427
2008/0175484 A1* 7/2008 Hartmann et al. ........... 382/195

* cited by examiner

*Primary Examiner*—Salman Ahmed
*Assistant Examiner*—N. Sloms

(57) ABSTRACT

A computer-implemented method receives a list of polygonal vertices associated with multiple polygons located in proximity to one another in a two-dimensional region and analyzes the polygonal vertices. The method automatically generates, based on the analysis, a polygonal hull that encloses the multiple polygons such that a line segment connecting any two polygonal vertices of the multiple polygons falls completely inside the generated polygonal hull. The multiple polygons may correspond to a two-dimensional geographic region. The computer-implemented method may be used for geographic regional segmentation.

15 Claims, 16 Drawing Sheets

SHRINK WRAP TECHNIQUE FOR ENCLOSING MULTIPLE POLYGONS

BACKGROUND

Network planning, such as, for example, planning a geographic layout of an optical fiber network, typically involves a manual analysis of a geographic map by a human planner. The human planner, based on known network requirements and constraints, may analyze a geographic map for the purpose of dividing the map into various regions that may correspond to different portions of the planned network. For example, each of the various regions may correspond to distribution or feeder points in the network. The size and extent of the geographic regions, segmented by the human planner, may place constraints on the number and type of network equipment that need to be installed. Typically, the human planner manually segments the geographic map and draws regional boundaries using hand tools. Such manual geographic segmentation can be time consuming and may be prone to human error.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments herein describe a "shrink wrap" process that may, in some implementations, be used to automatically segment geographic regions (e.g., for demographic analysis, etc.) where the analysis of a geographic area may be performed automatically by a machine (e.g., a computer in one implementation) and not manually performed by a human. During network planning such as, for example, planning a fiber optic network, geographic areas may need to be segmented into various regions that may correspond to distribution or feeder points in the network. The segmented geographic regions (e.g., their size and/or extent) can determine the number and type of network equipment that may need to be installed and how optical fiber of the network may need to be routed to one or more switches. The "shrink wrap" process of exemplary embodiments may permit this geographic segmentation to be performed automatically and in a systematic fashion that is accurate and less prone to error as compared to manual regional segmentation performed by a human.

Figure 1:
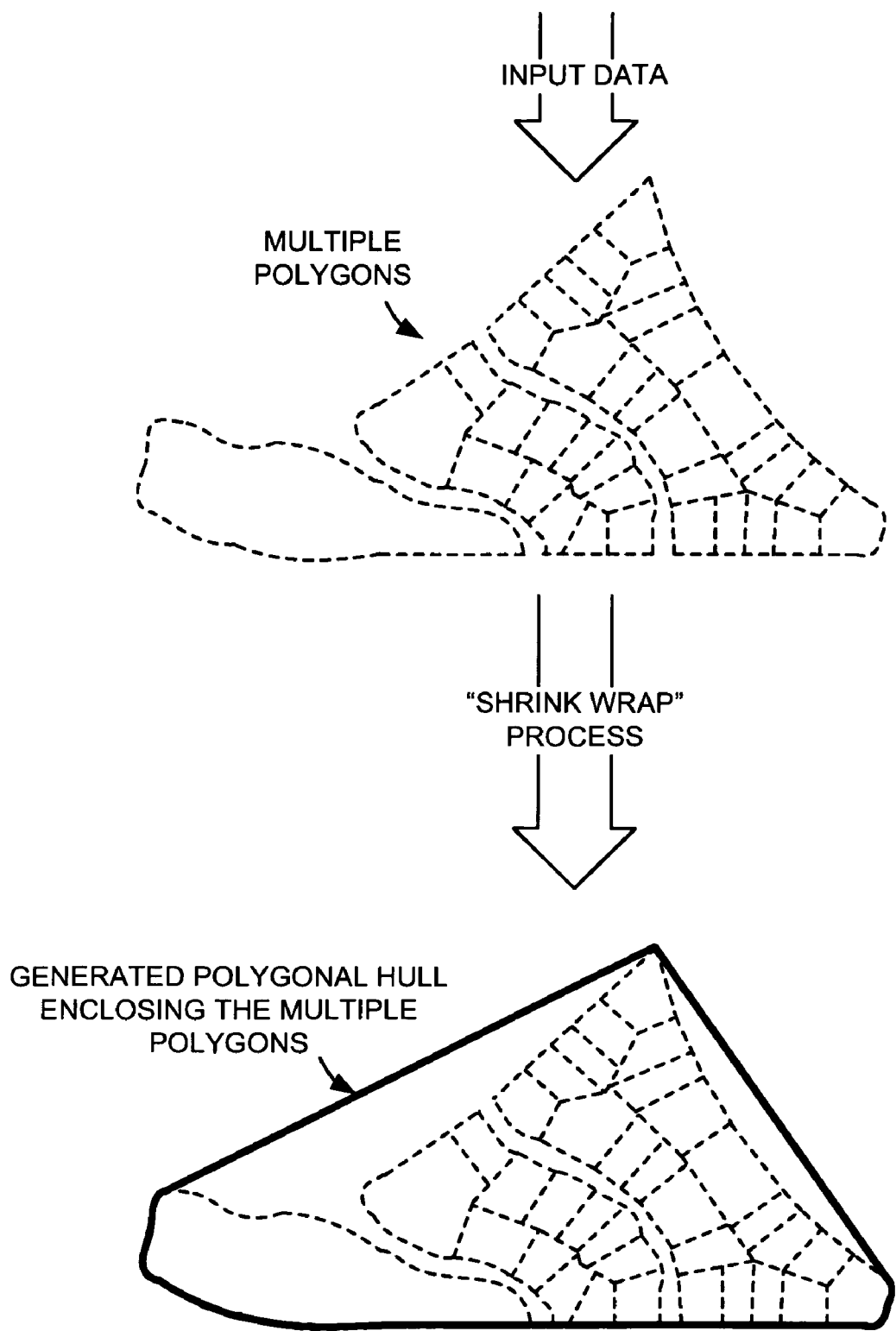
FIG. 1 is a diagram of an overview of exemplary embodiments described herein.

FIG. 1 is a diagram of an overview of an exemplary embodiment described herein in which multiple input polygons, located in proximity to one another in a two-dimensional region, are input into an process that can "shrink wrap" the multiple polygons with a polygonal hull that encloses the multiple polygons. A "polygon," as referred to herein, may be defined as multiple line segments, with each line segment terminating on a vertex of the polygon, a last line segment of the polygon connecting to a first line segment, and no intersection occurring between any two of the multiple line segments. In one implementation, the multiple polygons shown in FIG. 1 may represent a geographic region, such as one or more residential subdivisions and/or commercial areas, with each of the polygons representing a distinct parcel of land (e.g., a commercially zoned parcel, a residential parcel, a school parcel, etc.). As shown in FIG. 1, data corresponding to the multiple input polygons may be received by the process. The data may identify each of the polygonal vertices of each of the multiple input polygons. The data may, for example, be referenced to a two-dimensional coordinate system and the data may identify coordinate positions of each of the polygonal vertices of the multiple input polygons. The two-dimensional coordinate system may include, for example, a Cartesian coordinate system (other coordinate systems, however, may be used). The multiple input polygons may include one or more groups of polygons that have line segments that are located contiguous to one another (e.g., polygon edges touch one another). Polygons that have line segments that touch one another may be referred to herein as "contiguous polygons." In some circumstances, the multiple input polygons may include multiple groups of polygons that may or may not be contiguous to one another.

A computational device (not shown), such as, for example, a computer, may implement a "shrink wrap" process that automatically analyzes the polygonal vertices of the multiple polygons for the purpose of generating, as shown in FIG. 1, a two-dimensional polygonal hull that may enclose one or more of the multiple polygons. In one implementation, the generated polygonal hull may completely enclose all of the multiple polygons. The "shrink wrap" process may generate the polygonal hull such that no line segments connecting any two vertices of any of the polygons (e.g., whether the vertices are contiguous or otherwise) within the hull extend even partially outside of the polygonal hull. If the polygons of the multiple polygons are contiguous, the resultant polygonal hull generated by the "shrink wrap" process may wrap along the outline of the polygons and trace through concave gaps. If the any of the multiple polygons are not contiguous (e.g., the multiple polygons are segregated into multiple groups of polygons that are not contiguous), the resultant polygonal hull generated by the "shrink wrap" process may wrap along the outside boundary of each group of contiguous polygons, without tracing into the gaps between disconnected groups. The "shrink wrap" process disclosed herein may not, in some implementations, be applied to input polygon data where the hull resulting from execution of the "shrink wrap" process does not satisfy the definition of a polygon. The hull that results from the "shrink wrap" process described herein may itself be concave or convex.

Figure 2:
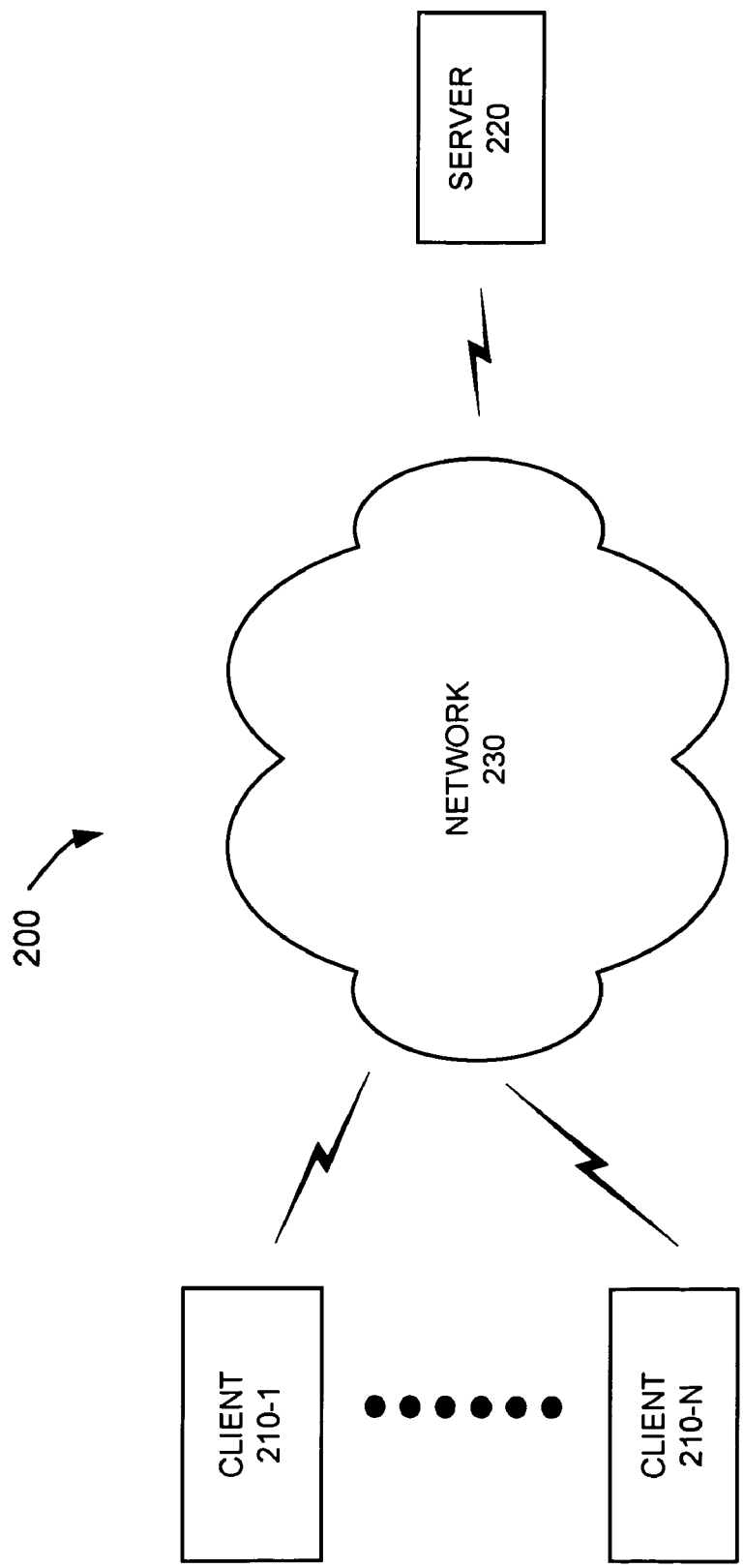
FIG. 2 is a diagram of a network in which a "shrink wrap" process of exemplary embodiments may be implemented.

FIG. 2 is a diagram of a network 200 according to an exemplary implementation. Network 200 may include multiple clients 210-1 through 210-N and a server 220 connected to a network 230 via wired or wireless links. Each of clients 210-1 through 210-N may include a device such as a desktop, laptop or palmtop computer, a cellular radiotelephone, a personal digital assistant (PDA), a Personal Communications Systems (PCS) terminal, or any other type of device or appliance that includes computational functionality. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. Each of clients 210-1 through 210-N may implement the exemplary "shrink wrap" process described herein, either alone, in conjunction with one or more other clients, or in conjunction with server 220. Server 220 may include a server entity that may implement the exemplary "shrink wrap" process described herein, either alone or in conjunction with one or more of clients 210-1 through 210-N.

Network(s) 230 may include one or more networks of any type, including a local area network (LAN); a wide area network (WAN); a metropolitan area network (MAN); a telephone network, such as a Public Switched Telephone Network (PSTN) or a Public Land Mobile Network (PLMN); a satellite network; an intranet, the Internet; or a combination of networks. The PLMN(s) may further include a packet-switched network, such as, for example, General Packet Radio Service (GPRS), Cellular Digital Packet Data (CDPD), or Mobile IP network.

Figure 3:
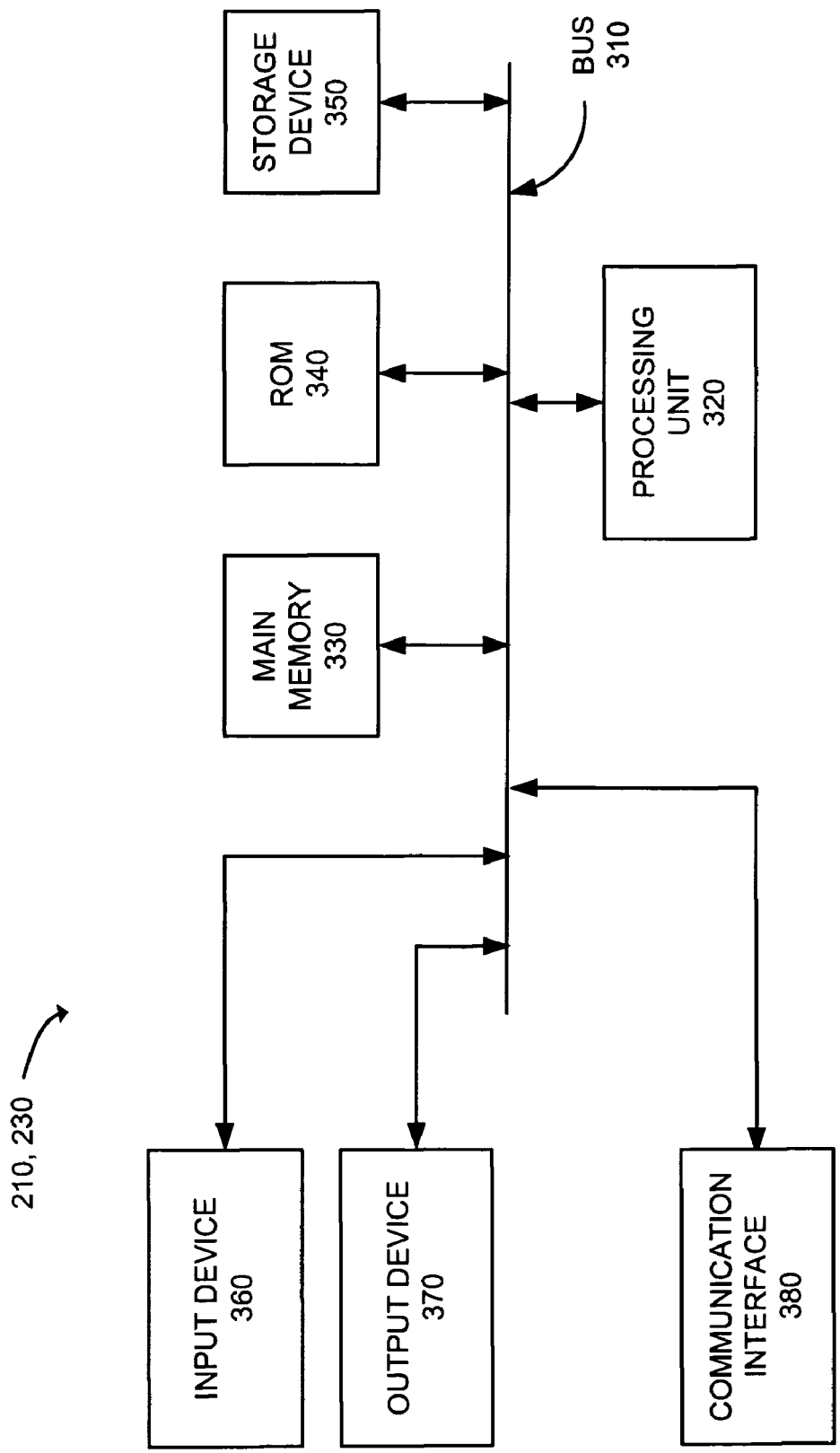
FIG. 3 is a diagram of a client or server entity of FIG. 2 according to an exemplary implementation.

FIG. 3 is an exemplary diagram of a client or server entity (hereinafter called "client/server entity"), which may correspond to one or more of clients 210-1 through 210-N and/or server 220, according to an exemplary implementation. The client/server entity may include a bus 310, a processing unit 320, a main memory 330, a read only memory (ROM) 340, a storage device 350, an input device 360, an output device 370, and a communication interface 380. Bus 310 may include a path that permits communication among the elements of the client/server entity.

Processing unit 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

The client/server entity may perform certain operations or processes described herein. The client/server entity may perform these operations in response to processing unit 320 executing software instructions contained in a computer-readable medium, such as memory 330. A computer-readable medium may be defined as a physical or logical memory device. Each of main memory 330, ROM 340 and storage device 350 may include computer-readable mediums. The magnetic and/or optical recording mediums (e.g., readable CDs or DVDs) of storage device 350 may also include computer-readable mediums.

The software instructions may be read into memory 330 from another computer-readable medium, such as data storage device 350, or from another device via communication interface 380. The software instructions contained in memory 330 may cause processing unit 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 4:
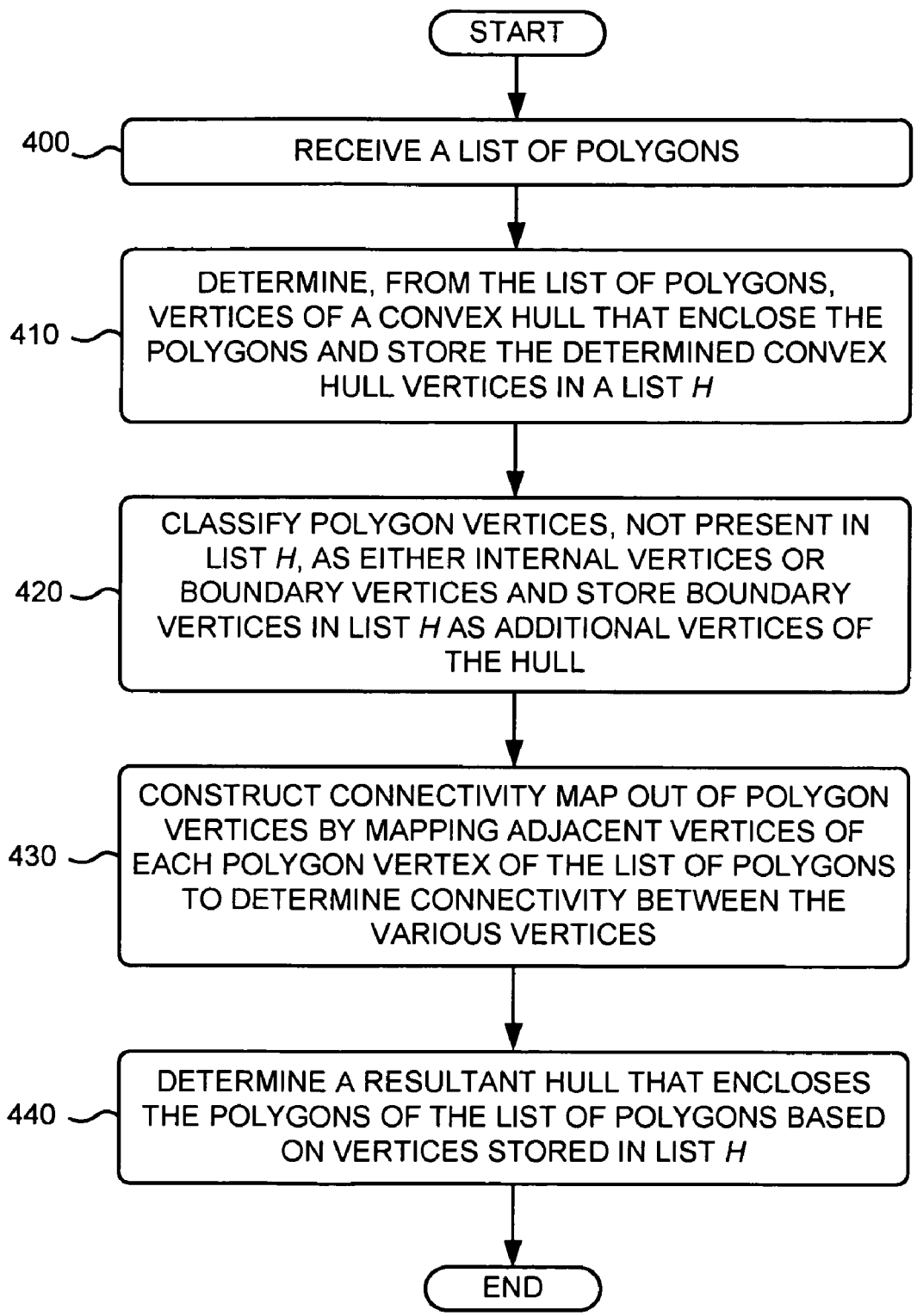
FIG. 4 is a flow diagram illustrating an exemplary "shrink wrap" process that may be used to generate a hull that encloses multiple polygons.

FIG. 4 is a flow diagram illustrating an exemplary "shrink wrap" process that may be used to generate a polygonal hull that encloses multiple polygons. The exemplary process of FIG. 4 may be implemented by one of clients 210-1 through 210-N, by server 220, by multiple clients 210-1 through 210-N working in conjunction with one another (e.g., via parallel processing), or by server 220 working in conjunction with one or more of clients 210-1 through 210-N. The "shrink wrap" process of FIG. 4 may, in one implementation, include a sequence of instructions stored in a computer-readable medium (e.g., main memory 330, ROM 340 and/or storage device 350) that may be executed by processing unit 320.

Figure 5:
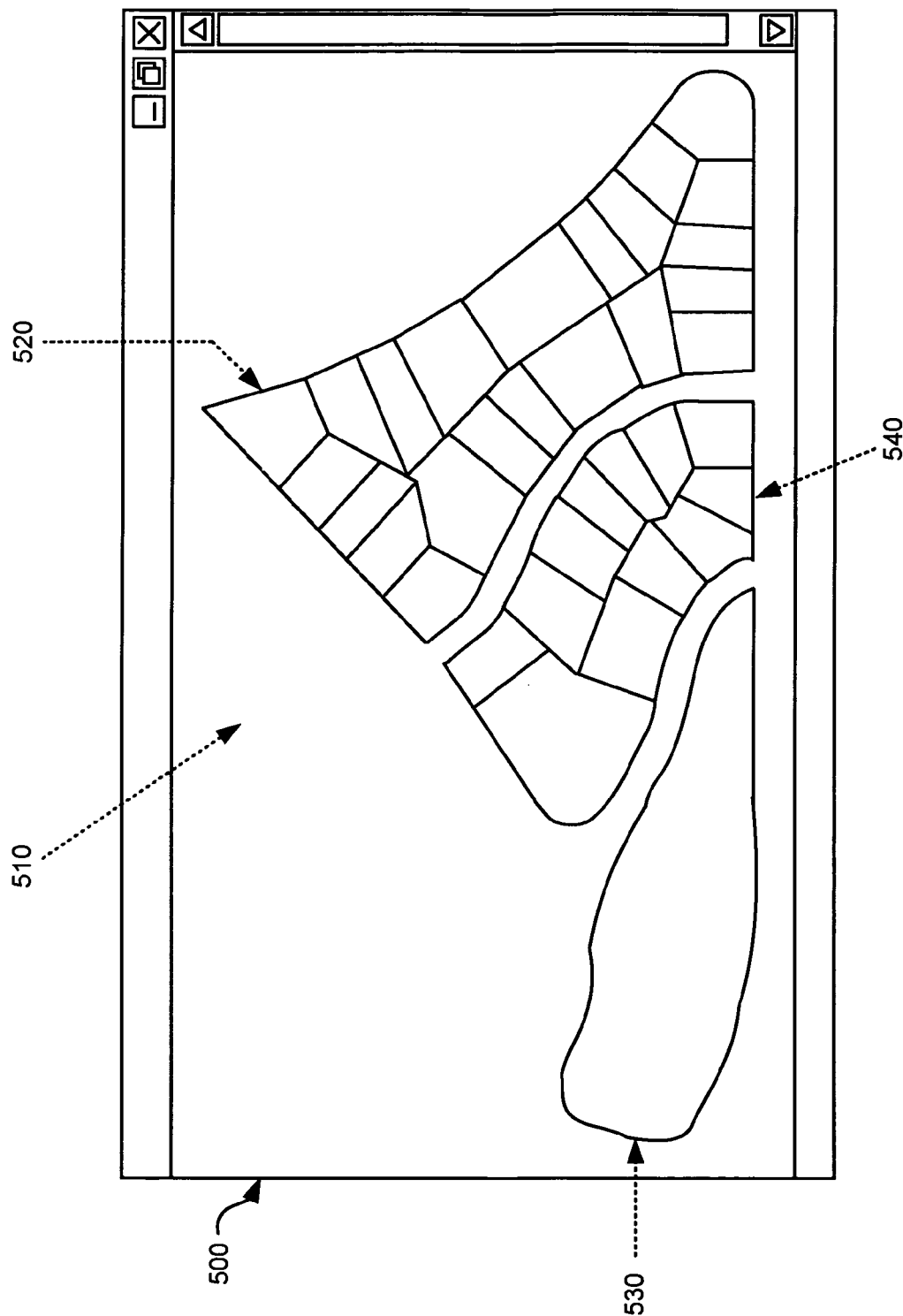
FIG. 5 is a diagram of an exemplary user interface that displays multiple input polygons.

The "shrink wrap" process may begin with receipt of a list of polygons (block 400). The list of polygons may include data that identifies each of the vertices of each of the polygons of the list. The data may, for example, be referenced to a two-dimensional coordinate system and may identify coordinate positions of each of the polygonal vertices of the multiple polygons in the list of polygons. The two-dimensional coordinate system may include, for example, a Cartesian coordinate system. The multiple input polygons may include one or more groups of polygons that have line segments that are located contiguous to one another (e.g., polygon edges touch one another). In some lists, the multiple input polygons may include multiple different groups of contiguous polygons. FIG. 5 is a graphical representation of a list of polygons received at one of clients 210-1 through 210-N or server 220 and displayed in a user interface 500. As shown in FIG. 5, the list of polygons 510 may include multiple groups of contiguous polygons, such as group 520, group 530 and group 540.

As further shown in FIG. 4, vertices of a convex hull may be determined, from the list of polygons, which enclose the polygons and the determined convex hull vertices may be stored in a list H that represents the vertices of the convex hull (block 410). Block 410 may, thus, determine an initial convex polygonal hull that encloses the polygons of the list of polygons and which may be modified in subsequent blocks 420-440 of FIG. 4.

Figure 6:
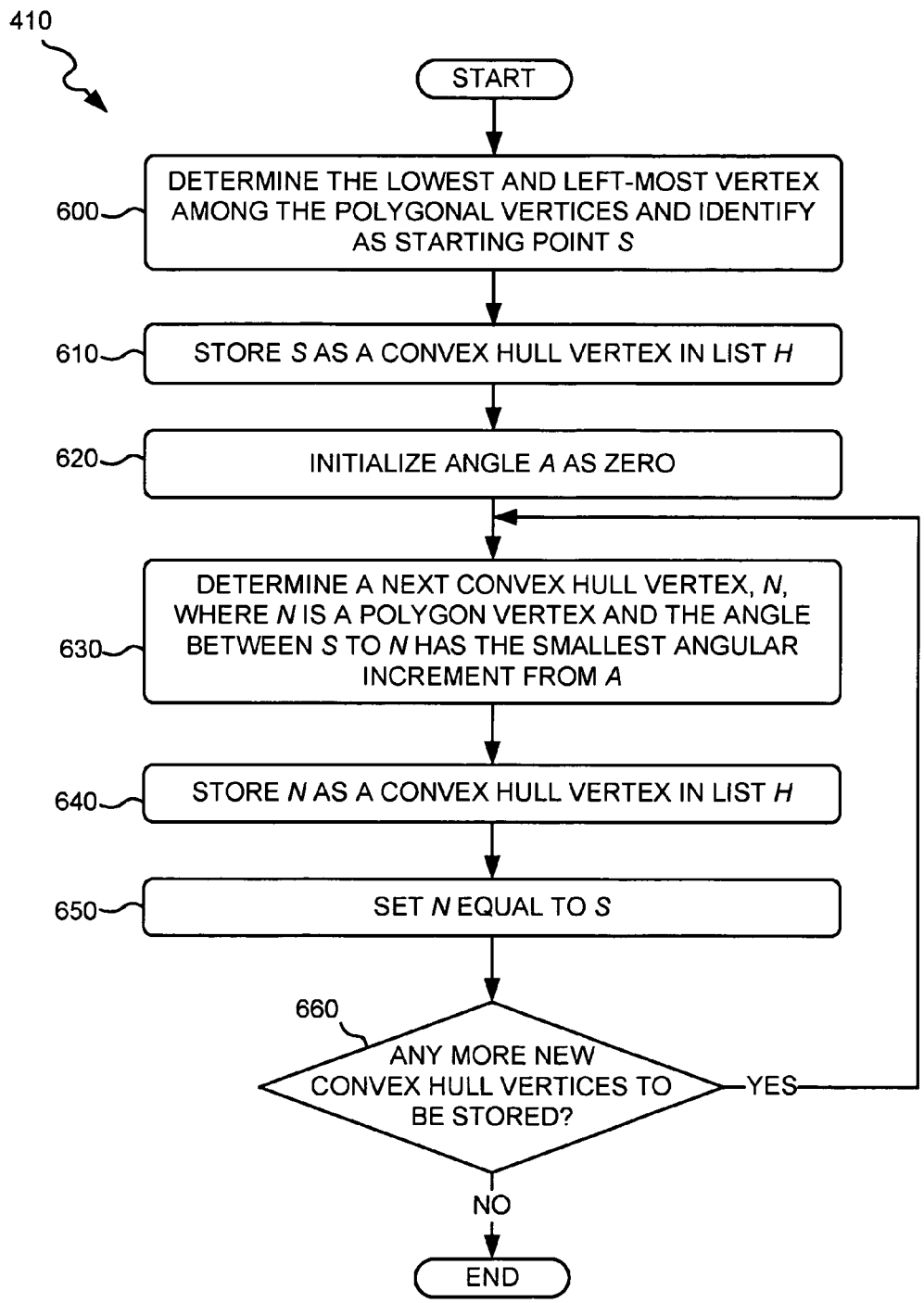
FIG. 6 is a flow diagram that illustrates further details of the determination of an initial convex polygonal hull that encloses the polygons of the list of polygons of block 410 of FIG. 4.
Figure 7A:
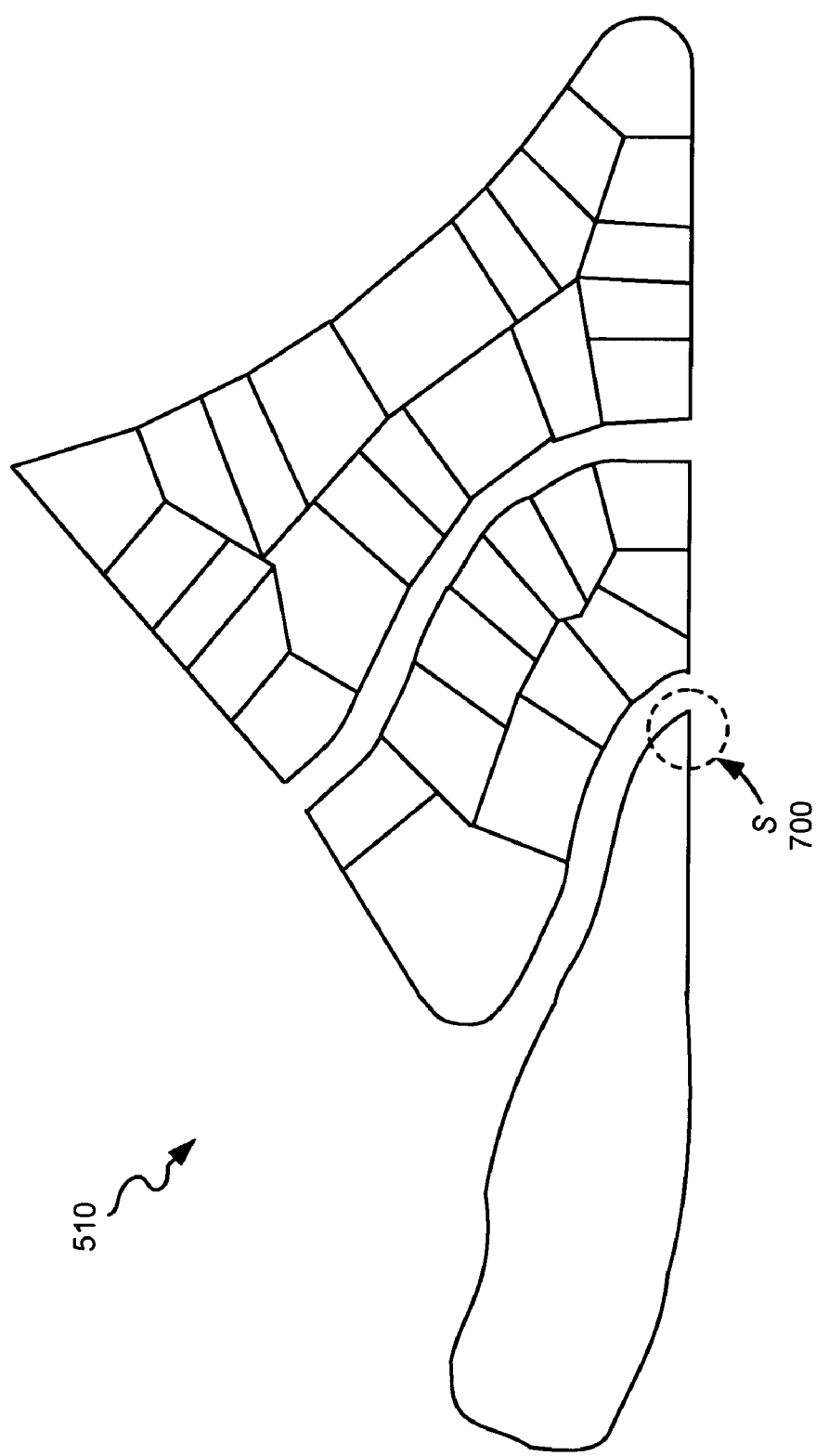
FIGS. 7A-7F depict illustrative examples of the selective repetition of blocks 630 through 660 of FIG. 6.

FIG. 6 illustrates further details of the determination of an initial convex polygonal hull that encloses the polygons of the list of polygons of block 410 of FIG. 4. As shown in FIG. 6, block 410 may begin with a determination of the lowest and left-most vertex among the polygonal vertices and identification of that vertex as a starting point S (block 600). As shown in the illustrative example of FIG. 7A, a polygonal vertex S 700 may be determined to be the lowest and left-most vertex among the polygonal vertices of polygons 510. S may be stored as a hull vertex in list H (block 610). The coordinate values (e.g., x and y coordinates in a Cartesian coordinate system) of the vertex S may be stored in list H, which may represent the vertices of the hull, in memory (e.g., main memory 330, ROM 340, storage device 350).

Figure 7B:
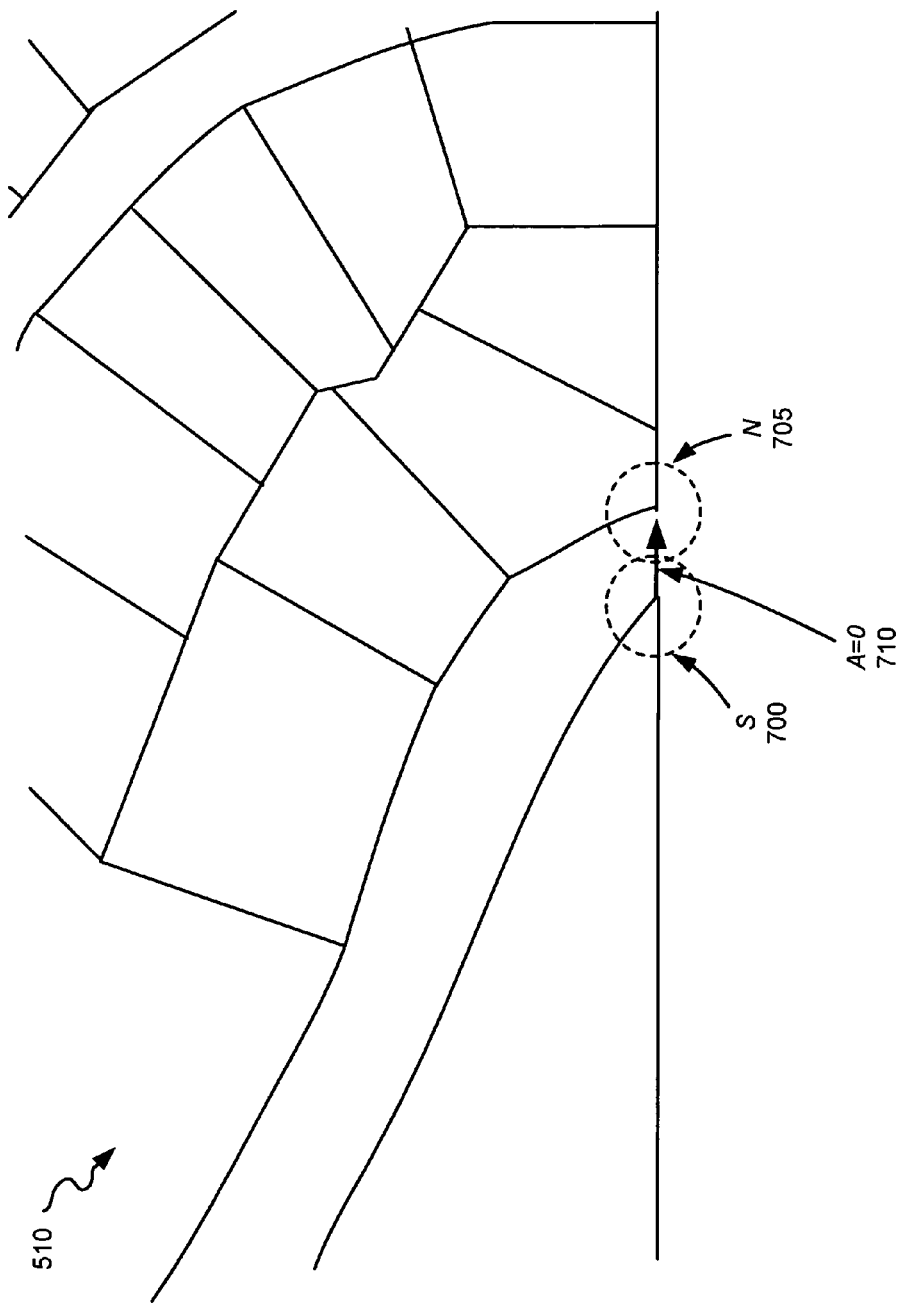

An angle A may be initialized to zero (block 620). Angle A may subsequently be used in block 630. A next hull vertex, N, may be determined, where N may include a polygonal vertex and an angle between S to N may include the smallest angular increment from angle A (block 630). As shown in the illustrative example of FIG. 7B, polygonal vertex N 705 may be determined as the next hull vertex N since an angular increment 710 between vertex S 700 and N 705 may include the smallest increment from angle A (e.g., an increment of zero in this case). The determined vertex N may be stored as a hull vertex in list H (block 640). The coordinate values (e.g., x and y coordinates in a Cartesian coordinate system) of the vertex N may be stored in list H, which may represent the vertices of the hull, in memory (e.g., main memory 330, ROM 340, storage device 350).

The current vertex N (determined in block 630) may be set equal to S (block 650) and a determination may be made whether there are any more new convex hull vertices to be stored in list H (block 660). For example, vertex N 705 in the illustrative example of FIG. 7B may be set equal to S. If there are more new convex hull vertices (e.g., more new vertices exist in a counter-clockwise order around the multiple polygons) (YES—block 660), then the exemplary process may return to block 630 with the determination of a next convex hull vertex in the multiple polygons. Blocks 630 through 660 then may be selectively repeated until there are no more new convex hull vertices left to be stored, and block 410 may then conclude and the process may continue at block 420 of FIG. 4.

Figure 7C:
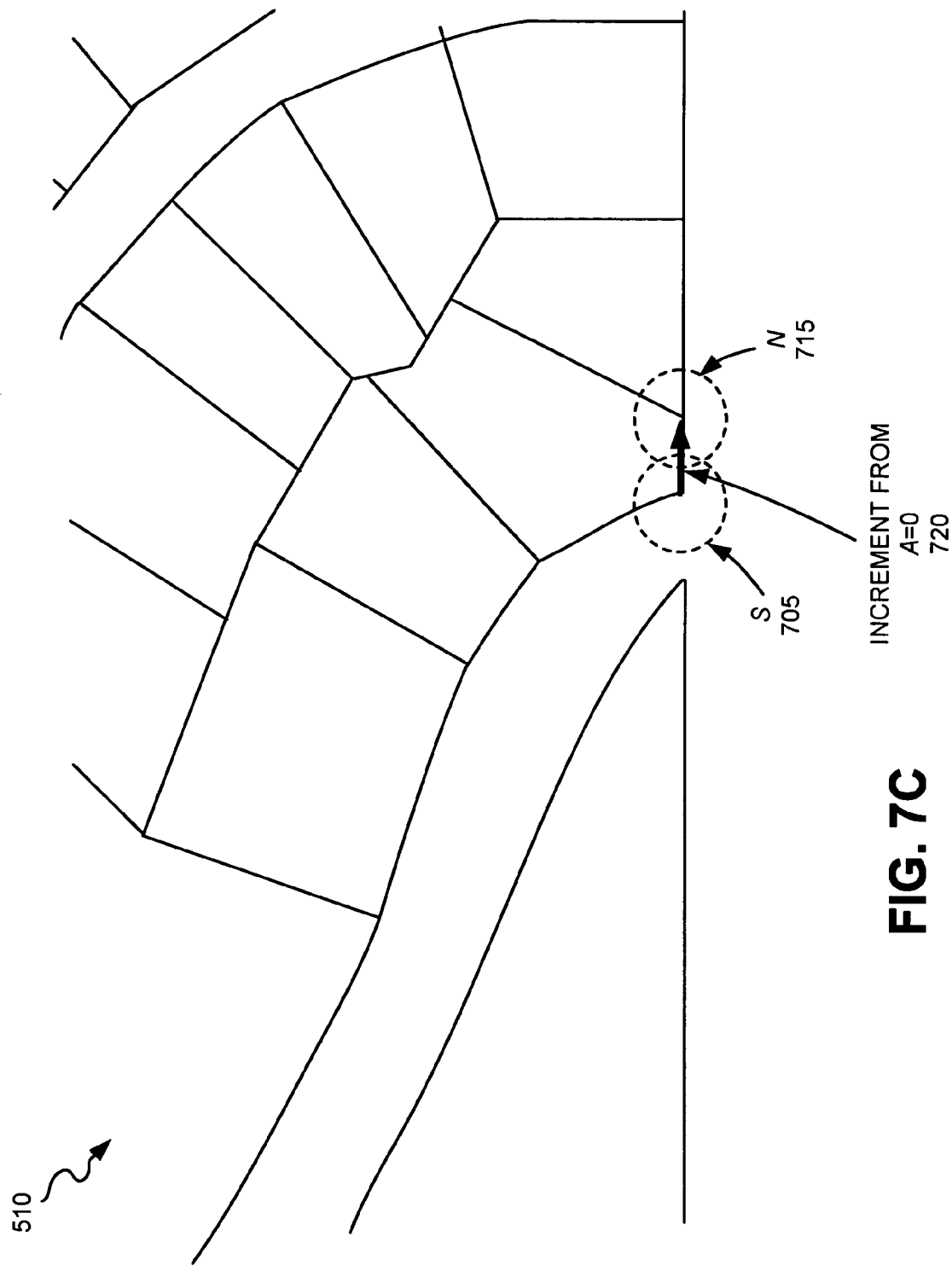
Figure 7D:
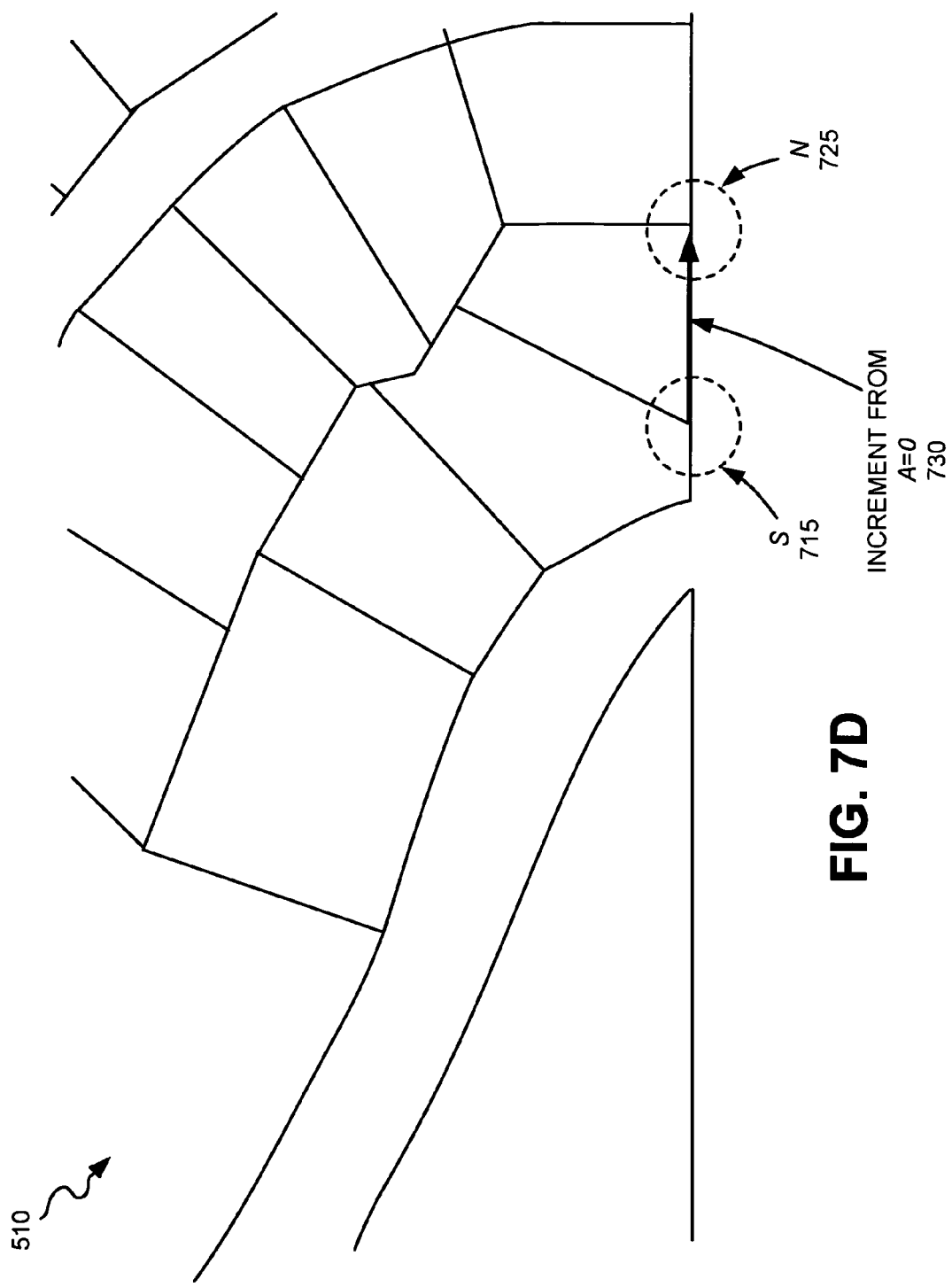
Figure 7E:
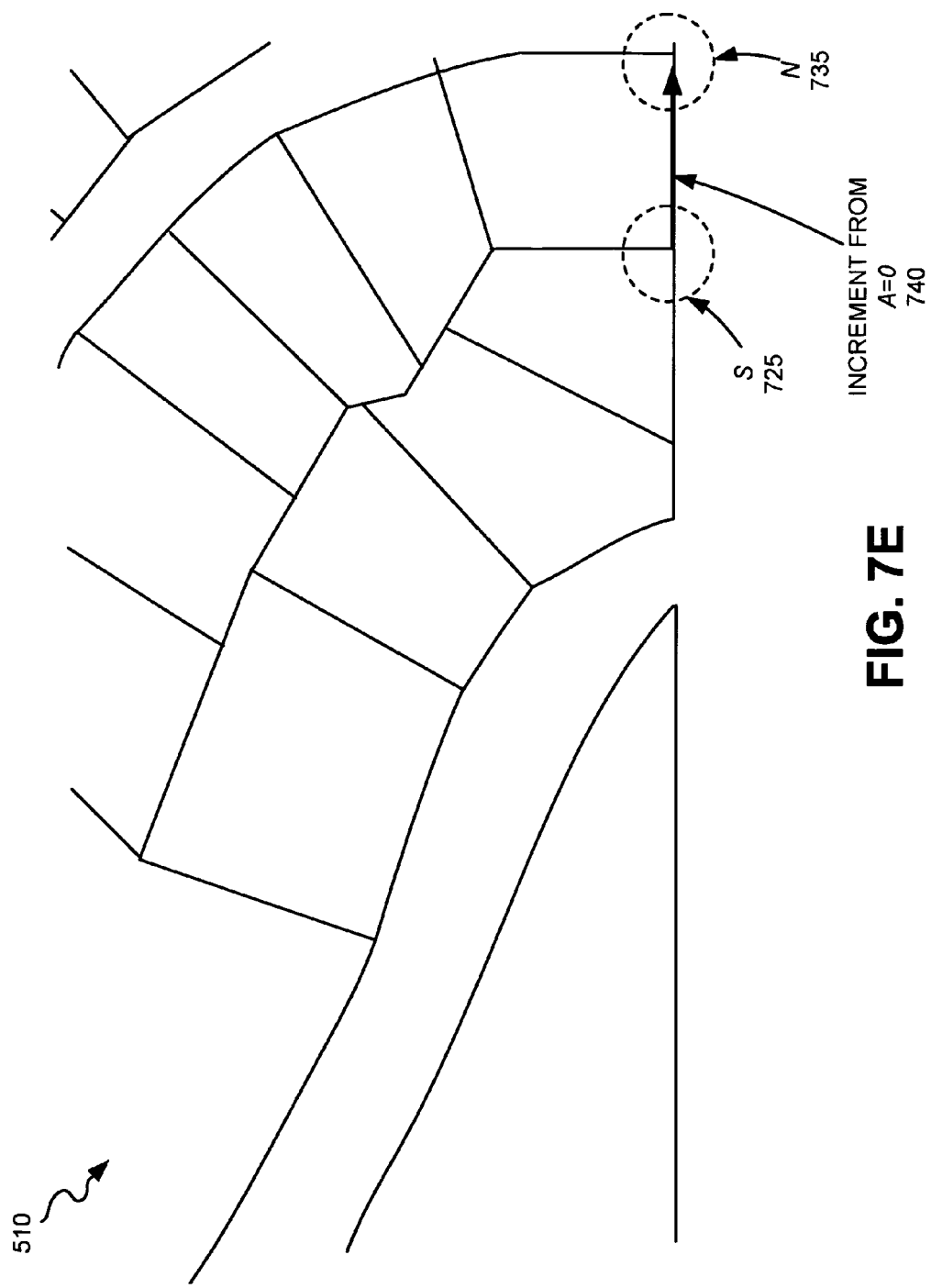
Figure 7F:
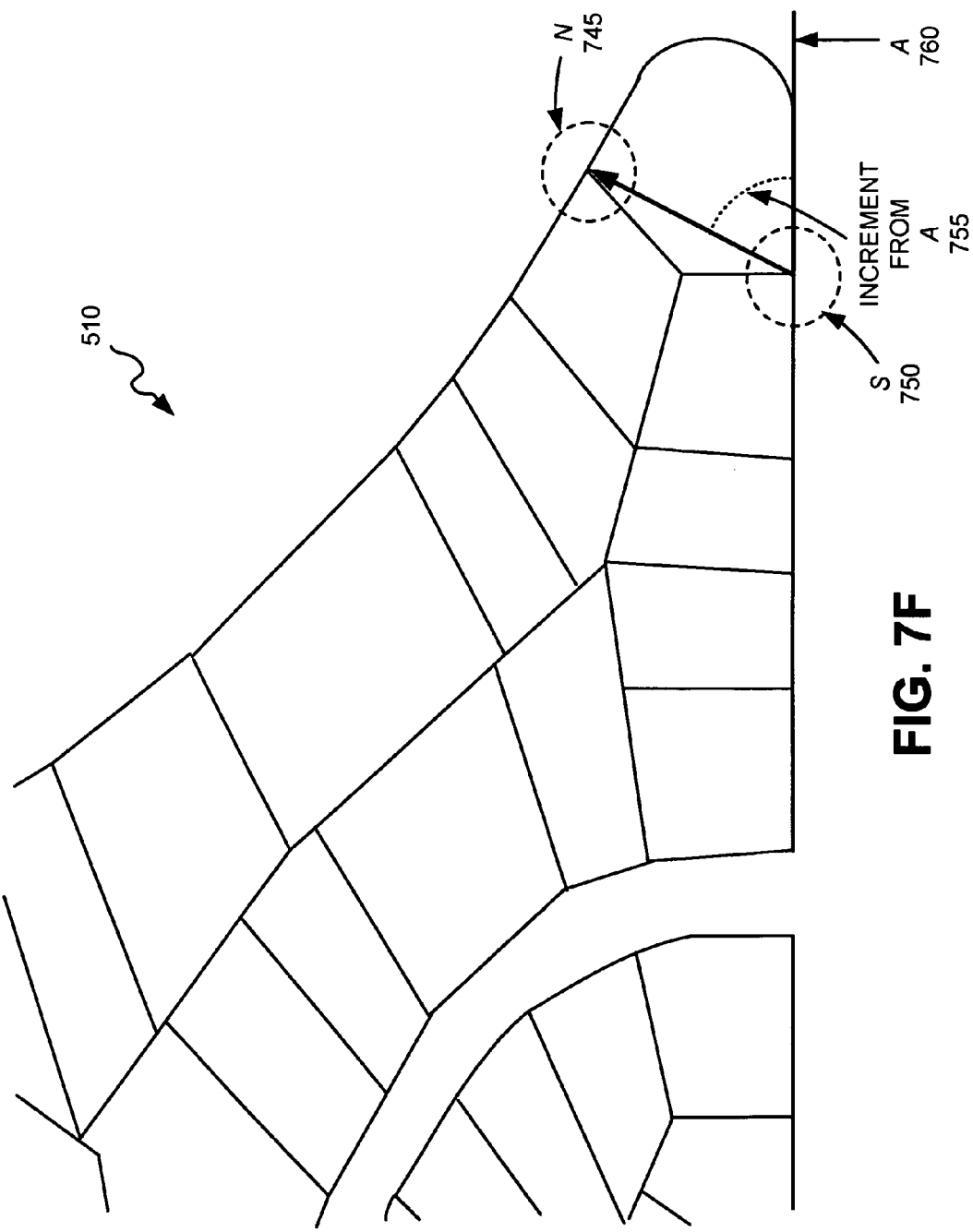

FIGS. 7C-7F depict illustrative examples of selective repetition of blocks 630 through 660 to determine additional new hull vertices to store in list H. As shown in FIG. 7C, polygonal vertex 715 may be determined as the next hull vertex N since an angular increment 720 between vertex S 705 and N 715 may include a smallest increment from angle A (e.g., an increment of zero in this case). FIG. 7D further depicts that polygonal vertex 725 may be determined as the next hull vertex N, as the process traverses counter-clockwise around the multiple polygons) since an angular increment 730 between vertex S 715 and N 725 may include a smallest increment from angle A (e.g., an increment of zero in this case). FIG. 7E additionally depicts that polygonal vertex 735 may be determined as a next hull vertex N since an angular increment 740 between vertex S 725 and N 735 may include a smallest increment from angle A (e.g., an increment of zero in this case). FIG. 7F further depicts that another polygonal vertex 745 may be determined as a next hull vertex N at a point in the selective repetition of blocks 630 through 660 where the right-most extent of polygons 510 has been reached. As shown in FIG. 7F, vertex N 745 may be determined as a next hull vertex since an angular increment 755 between vertex S 750 and N 745 may include a smallest increment from angle A 760 (in this case, an increment greater than zero, but less than 90 degrees). The selective repetition of blocks 630 through 660, as depicted in the illustrative examples of FIGS. 7C-7F, may be repeated, traversing counter-clockwise around the outer perimeter of polygons 510, until there are no more new convex hull vertices to be stored in list H (e.g., a full traverse has been conducted around an outer extent of polygons 510).

Figure 8:
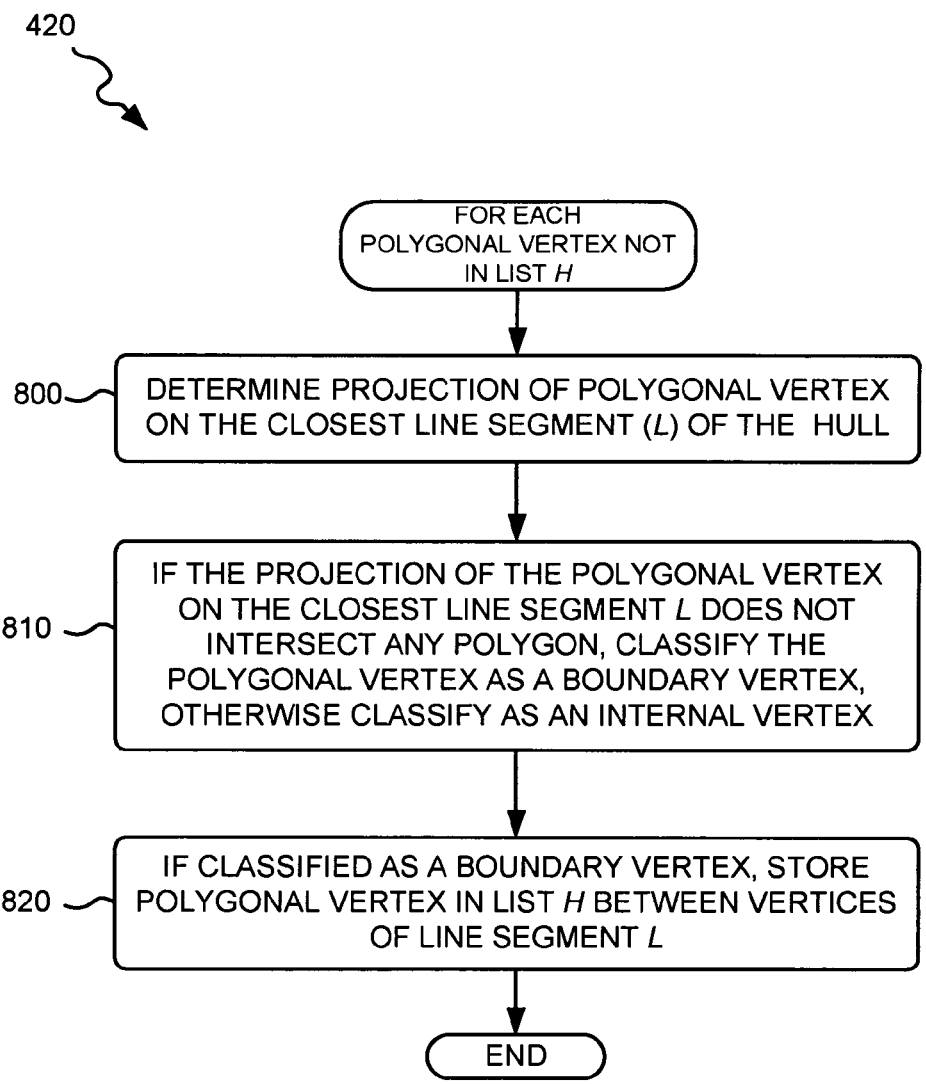
FIG. 8 is a flow diagram that illustrates exemplary details of the classification of polygonal vertices as either internal vertices or boundary vertices of block 420 of FIG. 4.

Returning to FIG. 4, polygon vertices of the multiple polygons, not currently present in list H, may be classified as either internal vertices or boundary vertices and the boundary vertices may be stored in list H as additional vertices of the hull (block 420). Block 420 may identify polygonal vertices as hull vertices that were not stored in list H during block 410. FIG. 8 illustrates further exemplary details of classification of polygonal vertices as either internal vertices or boundary vertices of block 420 of FIG. 4. Blocks 800 through 820 of FIG. 8 may be selectively repeated for each polygonal vertex of polygons 510 that are not contained in list H. Block 420 of FIG. 4 may, thus, analyze each polygonal vertex of polygons 510 that is not currently contained in list H which stores the vertices of the hull.

Figure 9:
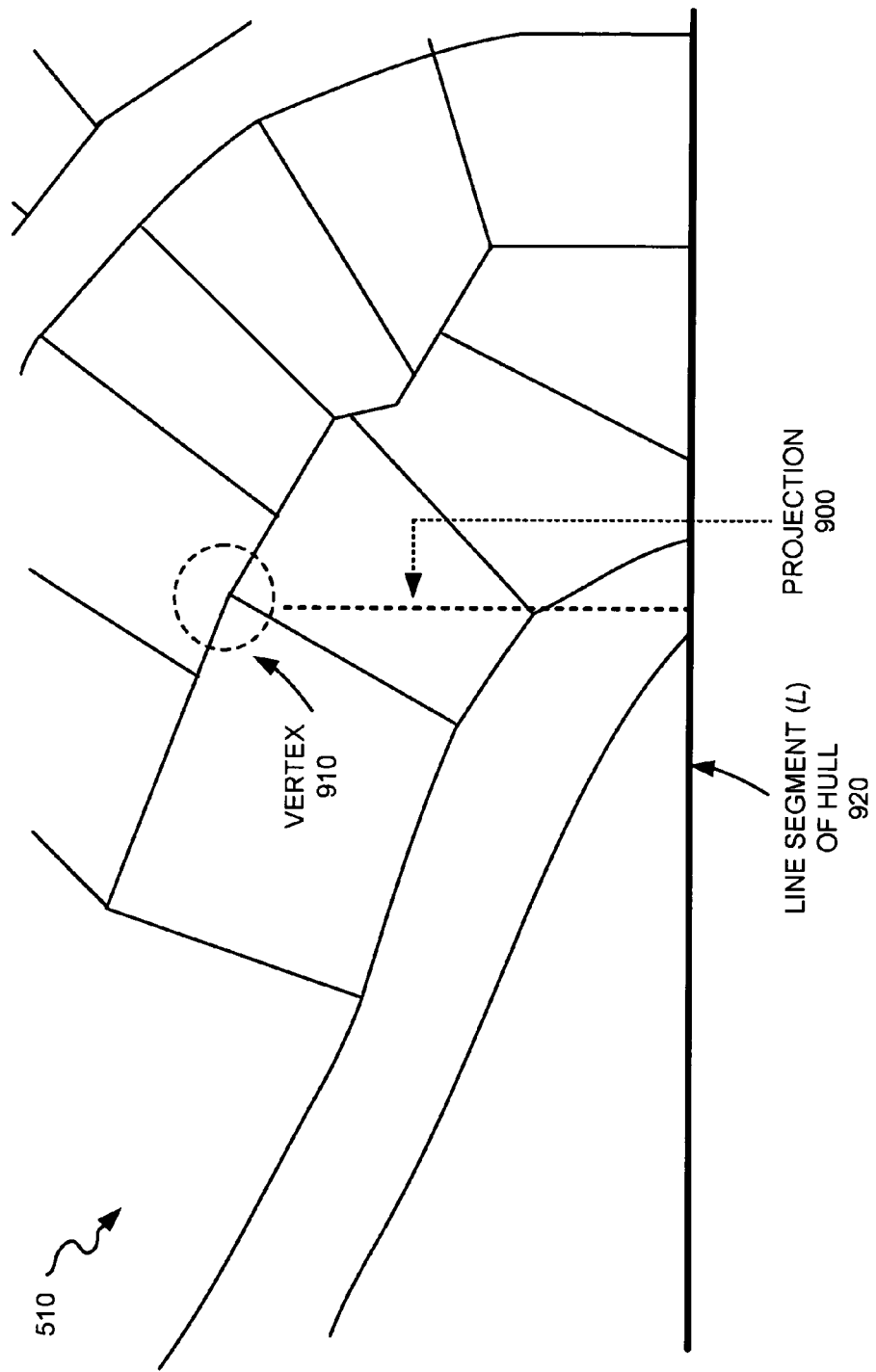
FIG. 9 depicts an illustrative example of the extension of a projection from a polygonal vertex to a line segment of the hull.

Block 420 may begin with determination of a projection of the polygonal vertex on a closest line segment (L) of the hull (block 800). The closest line segment L of the hull may be determined from the current polygonal vertices stored in list H. FIG. 9 depicts an illustrative example of block 800. As shown in the illustrative example of FIG. 9, a projection 900 may be extended directly from a polygonal vertex 910, which is being analyzed, to a line segment L 920 of the hull. The polygonal vertex may be classified as a boundary vertex if the projection of the polygonal vertex on the closest line segment L of the hull does not intersection any other polygon of polygons 510, otherwise the polygonal vertex may be classified as an internal vertex (block 810). Referring to the example of FIG. 9, projection 900 may not intersect a polygon of polygons 510 and, therefore, vertex 910 may be classified as an internal vertex. If classified as a boundary vertex, the polygonal vertex may be stored in list H between vertices of the line segment L of the hull (block 820). Referring again to the example of FIG. 9, since vertex 910 has been classified as an internal vertex, vertex 910 may not be stored in list H.

Returning again to FIG. 4, a connectivity map may be constructed out of the polygon vertices by mapping adjacent vertices of each polygon vertex of the list of polygons to determine connectivity between the various vertices of the list of polygons (block 430). The connectivity map may, for example, correspond to the visual interconnection of polygonal vertices depicted in FIG. 5, where the connectivity between the various vertices of the polygons 500 can be determined.

Figure 10:
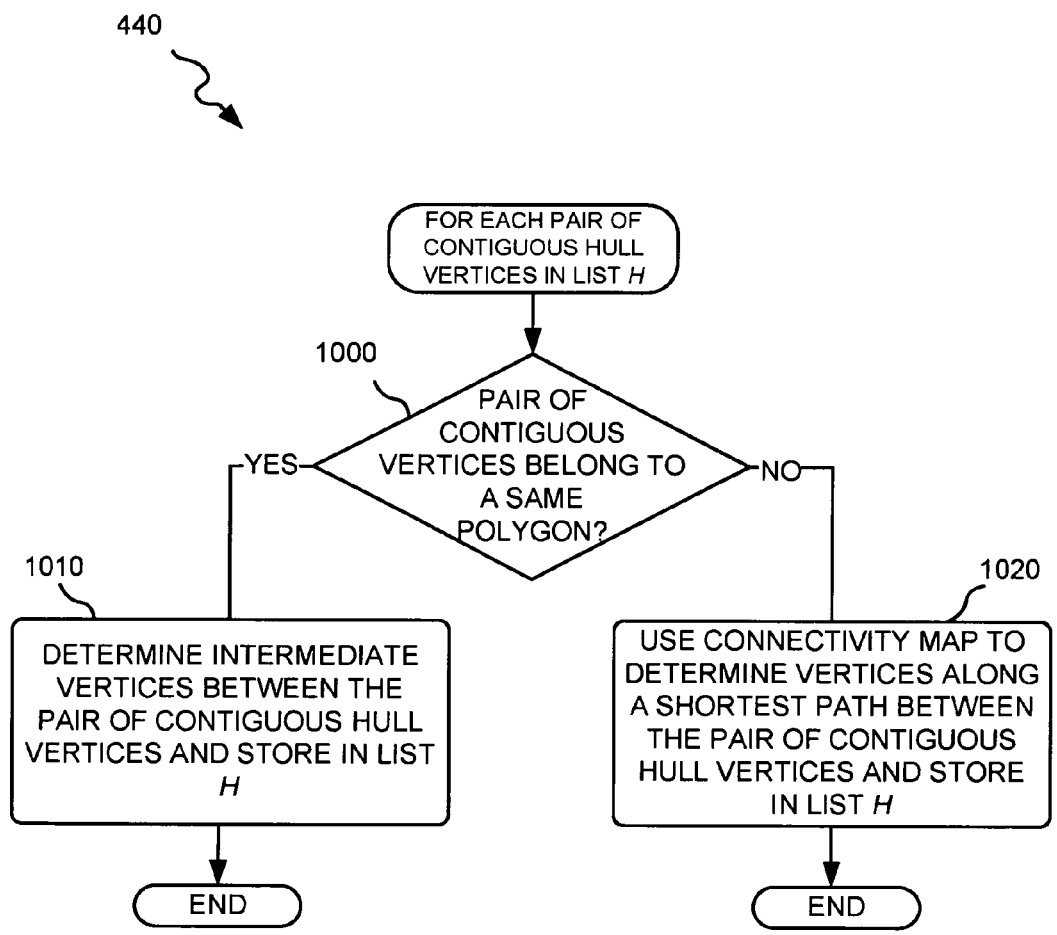
FIG. 10 is a flow diagram that includes further exemplary details of at least a portion of the determination of the resultant hull that encloses the polygons of the list of polygons of block 440 of FIG. 4.

A resultant hull that encloses the polygons of the list of polygons may be determined based on the vertices stored in list H (block 440). Block 440 of the exemplary process of FIG. 4 may further include blocks 1000, 1010 and 1020 of FIG. 10, which may be executed for each pair of contiguous hull vertices stored in list H. FIG. 10, thus, illustrates further exemplary details of at least a portion of the determination of the resultant hull that encloses the polygons of the list of polygons of block 440 of FIG. 4.

Block 440 may begin with a determination of whether the pair of contiguous vertices belongs to a same polygon (block 1010). The pair of contiguous vertices may span across two different polygons or may be part of a single polygon of polygons 500. If the pair of contiguous vertices belong to a same polygon (YES—block 1000), then intermediate vertices between the contiguous hull vertices may be determined and stored in list H (block 1010). If the pair of contiguous vertices does not belong to a same polygon, then the connectivity map, determined in block 430 above, may be used to determine one or more vertices that may exist along a shortest path between the pair of contiguous vertices and the determined one or more vertices may be stored in list H (block 1020). Blocks 1000 through 1020 may be selectively repeated for each pair of contiguous hull vertices stored in list H.

Figure 11:
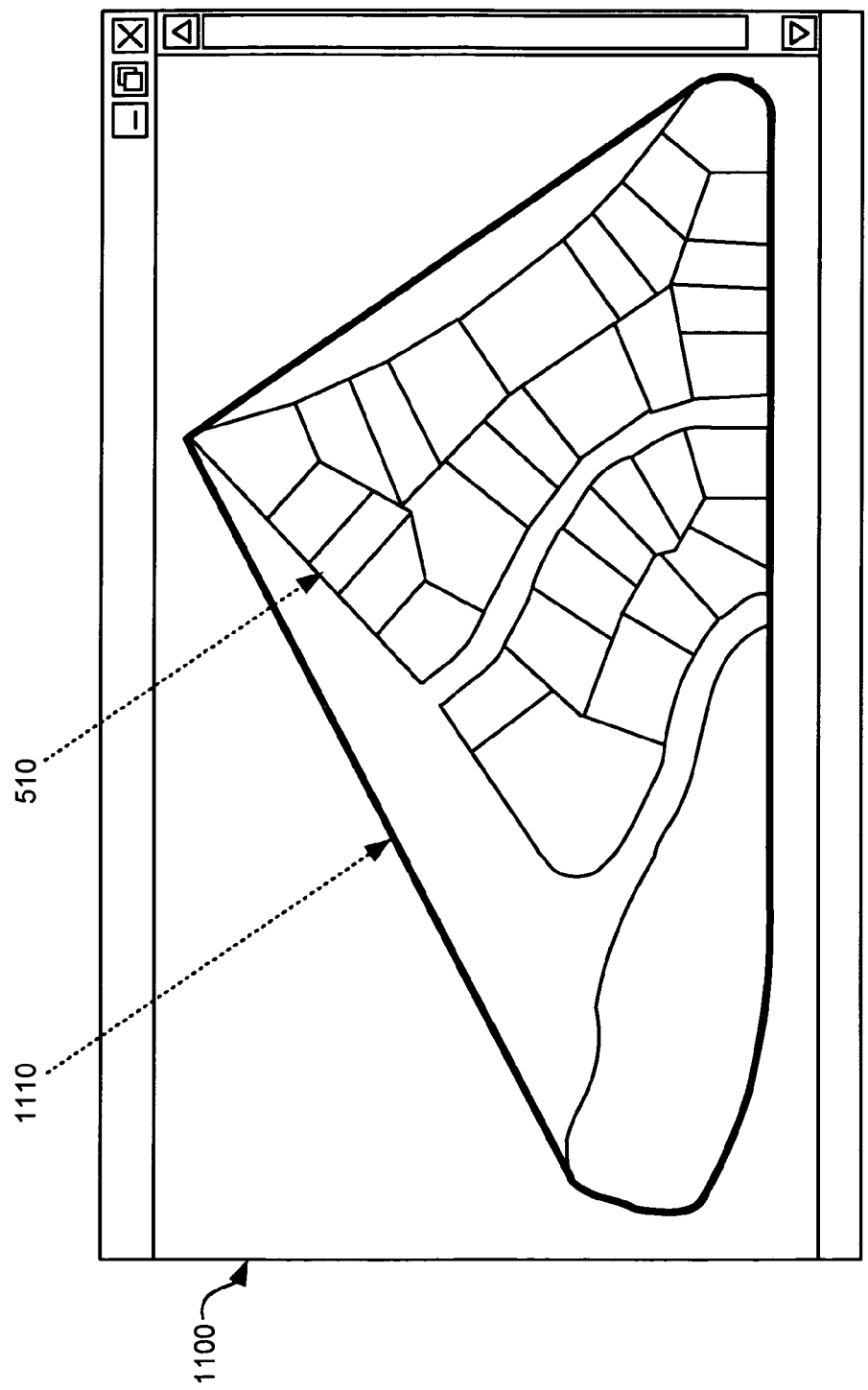
FIG. 11 is a diagram of an exemplary user interface that displays a polygonal hull that results from execution of the "shrink wrap" process and which encloses the multiple input polygons.

Returning again to FIG. 4, the resultant hull that encloses the polygons of the list of polygons may be represented by the vertices stored in list H after the completion of blocks 400 through 440 of FIG. 4. FIG. 11 is a graphical representation of a resultant polygonal hull 1110 that the "shrink wrap" process determines to enclose polygons 510 and displays in a user interface 1100. As shown in FIG. 11, no line segments connecting any two vertices of any of the polygons of polygons 510 (e.g., whether the vertices are contiguous or otherwise) within hull 1110 may extend outside (i.e., either partially or wholly) of hull 1110 that results from execution of the "shrink wrap" process. Since polygons 510 may include multiple groups of polygons that are not contiguous, hull 1110 may wrap along the outside boundary of each group of contiguous polygons without tracing into the gaps between the disconnected groups.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while series of blocks have been described with regard to FIGS. 4, 6, 8 and 10, the order of the blocks may be modified in other embodiments. Further, non-dependent blocks may be performed in parallel. Exemplary embodiments described herein are described as generating a hull to enclose multiple polygons in a two-dimensional space. The "shrink wrap" process described herein may be adapted to apply to three dimensional solids and/or surfaces in a three dimensional space.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A non-transitory computer-readable medium containing instructions executable by at least one processor, the non-transitory computer-readable medium comprising:
   one or more instructions for receiving data corresponding to a plurality of polygons, where the data identifies polygonal vertices associated with each of the plurality of polygons, the plurality of polygons corresponding to a plurality of two-dimensional geographic regions of a communication network, and where the plurality of polygons include multiple groups of contiguous polygons and at least one of the groups of contiguous polygons is not contiguous with another one of the groups of contiguous polygons;
   one or more instructions for automatically generating a polygonal hull that encloses the plurality of polygons such that a line segment connecting any two polygonal vertices of the plurality of polygons falls completely inside the generated polygonal hull and
   one or more instructions for determining a quantity of network equipment to install, for at least a portion of the communication network, based in part on the generated polygonal hull.

2. The computer-readable medium of claim 1, further comprising:
   one or more instructions for analyzing the polygonal vertices associated with the plurality of polygons,
   where automatically generating the polygonal hull that encloses all of the plurality of polygons is based on the analysis of the polygonal vertices.

3. The computer-readable medium of claim 1, where each of the plurality of polygons comprises multiple line segments, where a last one of the multiple line segments connects to a first one of the multiple line segments, and where there is no intersection between any two line segments of the multiple line segments.

4. The computer-readable medium of claim 1, where the data identifies polygonal vertices as coordinates in a coordinate system.

5. The computer-readable medium of claim 4, where the coordinate system comprises a two-dimensional coordinate system.

6. The computer-readable medium of claim 5, where the two-dimensional coordinate system comprises a Cartesian coordinate system.

7. The computer-readable medium of claim 1, further comprising:
   one or more instructions for visually displaying the generated polygonal hull in association with the plurality of polygons.

8. A method performed by one or more server devices, comprising:
   receiving, by one or more processors of the one or more server devices, a list of polygonal vertices associated with a plurality of polygons located in proximity to one another in a two-dimensional space, where the plurality of polygons correspond to a two-dimensional geographic region of distribution points in a communication network;
   analyzing, by one or more processors of the one or more server devices, the polygonal vertices;
   automatically generating, by one or more processors of the one or more server devices, based on the analysis, a polygonal hull that encloses the plurality of polygons such that a line segment connecting any two polygonal vertices of the plurality of polygons falls completely inside the generated polygonal hull; and
   determining, by one or more processors of the one or more server devices, a quantity of network equipment to install, for at least a portion of the communication network, based in part on the generated polygonal hull.

9. The computer-implemented method of claim 8, where each of the plurality of polygons comprises multiple line segments, where a last one of the multiple line segments connects to a first one of the multiple line segments, and where there is no intersection between any two line segments of the multiple line segments.

10. The computer-implemented method of claim 8, where the plurality of polygons include multiple groups of polygons which are not contiguous with one another.

11. The computer-implemented method of claim 8, where the data identifies polygonal vertices as coordinates in a coordinate system.

12. The computer-implemented method of claim 11, where the coordinate system comprises a two-dimensional coordinate system.

13. The computer-implemented method of claim 12, where the two-dimensional coordinate system comprises a Cartesian coordinate system.

14. The computer-implemented method of claim 8, further comprising:
   visually displaying the generated polygonal hull in association with the plurality of polygons.

15. A system, comprising:
   a non-transitory computer-readable medium to store instructions associated with a process;
   a processing unit to execute the stored instructions to:
      receive data corresponding to a plurality of polygons, where the plurality of polygons correspond to a two-dimensional geographic region of distribution points in a communication network and where the data identifies polygonal vertices associated with each of the plurality of polygons,
      analyze the polygonal vertices associated with the plurality of polygons, and
   generate, based on the analysis, a polygonal hull that encloses the plurality of polygons such that a line segment connecting any two polygonal vertices of the plurality of polygons falls completely inside the generated polygonal hull;
   determine how to route communication cables between at least two switches, for at least a portion of the communication network, based in part on the generated polygonal hull; and
   an output device to provide a visual representation of the generated polygonal hull and how to route the communication cables between the at least two switches.

* * * * *